(12) United States Patent
Watson et al.

(10) Patent No.: US 7,920,320 B2
(45) Date of Patent: Apr. 5, 2011

(54) ELECTRONIC READING DEVICES

(75) Inventors: Ben Watson, London (GB); Nick Sandham, London (GB); David Fisher, London (GB); Duncan Barclay, London (GB); Simon Jones, London (GB); Carl Hayton, London (GB); Anusha Nirmalananthan, London (GB)

(73) Assignee: Plastic Logic Limited, Cambridge, Cambridgeshire (GB)

( * ) Notice: Subject to any disclaimer, the term of this patent is extended or adjusted under 35 U.S.C. 154(b) by 0 days.

(21) Appl. No.: 12/027,176

(22) Filed: Feb. 6, 2008

(65) Prior Publication Data

US 2008/0298083 A1    Dec. 4, 2008

(30) Foreign Application Priority Data

Feb. 7, 2007    (GB) .................................. 0702350.0

(51) Int. Cl.
*G02B 26/08*    (2006.01)
(52) U.S. Cl. ............ 359/296; 345/901; 345/107; 362/98
(58) Field of Classification Search .................... 362/98, 362/99, 97.1, 127, 217.04, 217.05, 296.01, 362/341; 345/84, 105, 107, 173, 901; 359/253, 359/254, 266, 290, 295–297
See application file for complete search history.

(56) References Cited

U.S. PATENT DOCUMENTS

| | | | |
|---|---|---|---|
| 4,453,200 A | 6/1984 | Treka et al. | |
| 4,856,088 A | 8/1989 | Oliwa et al. | |
| 5,347,630 A | 9/1994 | Ishizawa et al. | |
| 5,539,623 A * | 7/1996 | Gurz et al. | ....................... 362/20 |
| 5,857,157 A | 1/1999 | Shindo | |
| 5,956,034 A | 9/1999 | Sachs et al. | |
| 6,297,945 B1 | 10/2001 | Yamamoto | |
| 6,388,877 B1 | 5/2002 | Canova, Jr. et al. | |
| 6,456,732 B1 | 9/2002 | Kimbell et al. | |
| 6,661,920 B1 | 12/2003 | Skinner | |
| 6,831,662 B1 | 12/2004 | Lum et al. | |
| 6,842,279 B2 * | 1/2005 | Amundson | ................... 359/296 |
| 6,888,643 B1 | 5/2005 | Grimes | |
| 6,919,879 B2 * | 7/2005 | Griffin et al. | ................. 345/168 |
| 6,961,029 B1 | 11/2005 | Canova, Jr. et al. | |
| 7,058,829 B2 | 6/2006 | Hamilton | |
| 7,079,111 B2 * | 7/2006 | Ho | ............................... 345/156 |

(Continued)

FOREIGN PATENT DOCUMENTS

EP    0 283 235    5/1987

(Continued)

OTHER PUBLICATIONS

Search Report; GB 0802011.7; R. Jenkins; Jun. 18, 2008.

(Continued)

*Primary Examiner* — Hargobind S Sawhney
(74) *Attorney, Agent, or Firm* — Fish & Richardson P.C.

(57) ABSTRACT

The invention relates to electronic devices, in particular consumer electronic devices, including an electrophoactive display, as well as to electronic document reading devices, sometimes called e-readers, such as electronic books. We describe an electronic device including an electroactive display and a light to illuminate said display, wherein said display has a viewing surface, and wherein said light is configured to illuminate said display from in front and to one side of an edge of said viewing surface, across said viewing surface and through a front-most surface of said display.

29 Claims, 8 Drawing Sheets

U.S. PATENT DOCUMENTS

| | | | |
|---|---|---|---|
| 7,154,452 B2 * | 12/2006 | Nakamura et al. | 345/1.1 |
| 7,289,084 B2 * | 10/2007 | Lesniak | 345/1.1 |
| 2002/0018027 A1 | 2/2002 | Sugimoto | |
| 2002/0102866 A1 | 8/2002 | Lubowicki | |
| 2004/0008398 A1 | 1/2004 | Amundson | |
| 2004/0268004 A1 | 12/2004 | Oakley | |
| 2005/0025387 A1 | 2/2005 | Luo | |
| 2005/0206580 A1 | 9/2005 | Koyama et al. | |
| 2005/0237444 A1 | 10/2005 | You | |
| 2005/0257143 A1 | 11/2005 | Lewis | |
| 2006/0026536 A1 * | 2/2006 | Hotelling et al. | 715/863 |
| 2006/0274549 A1 * | 12/2006 | Fukuyoshi | 362/602 |
| 2007/0024603 A1 | 2/2007 | Li | |
| 2007/0028086 A1 | 2/2007 | Oshima et al. | |
| 2007/0058178 A1 | 3/2007 | Kurihara et al. | |
| 2007/0115258 A1 | 5/2007 | Cupps et al. | |
| 2007/0195009 A1 * | 8/2007 | Yamamoto et al. | 345/1.1 |
| 2008/0151576 A1 * | 6/2008 | Inditsky | 362/615 |
| 2008/0297470 A1 | 12/2008 | Marsh et al. | |
| 2008/0297496 A1 | 12/2008 | Watson et al. | |
| 2009/0021210 A1 * | 1/2009 | Korall et al. | 320/101 |
| 2009/0109185 A1 | 4/2009 | Barclay et al. | |
| 2009/0109468 A1 | 4/2009 | Barclay et al. | |
| 2009/0109498 A1 | 4/2009 | Barclay et al. | |
| 2009/0113291 A1 | 4/2009 | Barclay et al. | |
| 2009/0219271 A1 | 9/2009 | Bandel et al. | |

FOREIGN PATENT DOCUMENTS

| | | |
|---|---|---|
| EP | 1 308 825 | 5/2003 |
| GB | 2 214 342 | 8/1989 |
| GB | 2 446 499 | 8/2008 |
| GB | 2 446 500 | 8/2008 |
| GB | 2 454 032 | 4/2009 |
| GB | 2 454 033 | 4/2009 |
| JP | 10-027162 | 1/1998 |
| JP | 2000292777 A * | 10/2000 |
| JP | 2005266968 | 9/2005 |
| JP | 2005274832 | 10/2005 |
| WO | 02/095555 | 11/2002 |
| WO | 03/017245 | 2/2003 |
| WO | 03/044765 | 5/2003 |
| WO | 2004/114259 | 12/2004 |
| WO | 2006/031347 | 3/2006 |
| WO | 2009/053738 | 4/2009 |
| WO | 2009/053740 | 4/2009 |
| WO | 2009/053743 | 4/2009 |
| WO | 2009/053747 | 4/2009 |

OTHER PUBLICATIONS

International Search Report; GB0801998.6; D. Maskery; May 28, 2008.
IDDO Genuth: "The Future of Electronic Paper" [Online]; Oct. 15, 2007, XP002513292; http://thefutureofthings.com/articles/1000/the-future-of-electronic-paper.html.
International Search Report; PCT/GB2008/050985; Feb. 23, 2009; E. Maciu.
International Search Report; GB 0802816.9; J. McCann; May 23, 2008.
International Search Report; PCT/GB2008/050977; Feb. 19, 2009; E. Maciu.
International Search Report; GB 0802818.5; J. McCann; May 29, 2008.
Search Report; GB0802820.1; R. Jenkins; Sep. 12, 2008.
International Search Report; PCT/GB2008/050975; Feb. 20, 2009; E. Maciu.
Search Report; PCT/GB2008/050980; Feb. 23, 2009; E. Maciu.
Search Report; GB 0801987.9; May 19, 2008; D. Mackery.
Search Report and Examiner Letter for Application No. GB0802011.7 (dated Aug. 27, 2009).
www.palm.com, Palm Z22, T/X, and Tungsten E2 handhelds (copyright 2005).

* cited by examiner

| | |
|---|---|
| 126a | MOISTURE BARRIER |
| 120 | ELECTROPHORETIC DISPLAY |
| 124 | ORGANIC ACTIVE MATRIX PIXEL DRIVER CIRCUITRY |
| 122 | SUBSTRATE |
| 126b | MOISTURE BARRIER |

ELECTRONIC READING DEVICES

CROSS-REFERENCE TO RELATED APPLICATIONS

This application claims the benefit of United Kingdom Patent Application No. 0702350.0, filed Feb. 7, 2007, which is incorporated in its entirety by reference herein.

BACKGROUND OF THE INVENTION

1. Field of the Invention

This invention relates to electronic devices, in particular consumer electronic devices, including an electrophoretic display, as well as to electronic document reading devices, sometimes called e-readers, such as electronic books.

2. Description of the Related Art

A number of techniques are known for illuminating LCD display panels, including some techniques which rely on guiding illumination within a light guide plate. Examples can be found in U.S. Pat. No. 5,739,887, U.S. Pat. No. 6,791,635, U.S. Pat. No. 6,343,868 and U.S. Pat. No. 6,734,929. A similar light guiding principle is also described in U.S. Pat. No. 5,118,138 for illuminating pages of a conventional book. Other techniques for illuminating the pages of a conventional book, generally involving a lamp on an arm, are described in U.S. Pat. No. 7,163,306, WO 87/05266 and U.S. Pat. No. 3,823,312.

By contrast, embodiments of the invention relate to electronic reading devices with a self-contained light source, but which do not use an LCD display panel but which instead employ an electroactive display, such as a reflective bistable display (for example an electrophoretic or other like displays), which presents special problems and opportunities. This is because such a display can be flexible, and hence can have a curved configuration, and also because it can be difficult to effectively guide light within such a display.

SUMMARY OF THE INVENTION

According to a first aspect of the invention there is therefore provided an electronic device including an electroactive display and a light to illuminate said display, wherein said display has a viewing surface, and wherein said light is configured to illuminate said display from in front and to one side of an edge of said viewing surface, across said viewing surface and through a front-most surface of said display.

In preferred embodiments of the electronic device the viewing surface of the electroactive display has a concave curvature (from a viewer's perspective). Then, preferably, the display is illuminated through a front (viewing) surface of the display by a stripe of illumination, preferably substantially along a complete edge of the viewing surface and directed across the viewing surface. Advantageously the light may be built into a spine of the device, in particular when the device comprises an electronic document reading device.

Preferably the illumination of the viewing surface of the display is substantially uniform; preferably the curvature of the viewing surface is chosen to provide such substantially uniform illumination. The precise details of the curvature may, in embodiments, depend upon the uniformity of the illumination across the stripe and/or directionality (conversion/divergence) of the illumination and/or the curvature, more particularly the variation in curvature, of the viewing surface with distance from the illuminating stripe. This may be modelled, for example, in a computer aided optical design system. In embodiments a (vertical) cross-section along a (horizontal) line through the viewing surface may have the form of a conic section such as circle, ellipse, parabola, or hyperbola.

In embodiments the light comprises a light source which may be at least partially behind the viewing surface of the display, in combination with an optical system such as a mirror or prism and/or light guiding optical system, to direct illumination from the light source onto the viewing surface from the front of the viewing surface. Additionally or alternatively the light may comprise a plurality of LEDs (light emitting diodes) which may be white and/or coloured. For example in embodiments a plurality of LEDs may be mounted in front of the viewing surface of the display (at least where the display meets the spine), facing the display and, preferably, provided with a light-diffusing window.

In some preferred embodiments the device has two electroactive displays mounted on a central support or spine (which may be an integral part of one of the displays), and in this case preferably the light is able to illuminate each of the electroactive displays either simultaneously or sequentially, for example in the case of an electronic reader page-by-page as the document is read.

In embodiments, in particular electronic reader embodiments, the light is capable of changing colour (here the reference to a colour includes white), for example by including LEDs of different colours. The device may then include a system to control a colour of the light, in particular in co-ordination with information displayed on the device. Thus in some preferred embodiments mood lighting may be provided in which the colour of the illumination is changed in co-ordination with an emotional content of the reading matter, for example scary/thrilling, romantic, funny, happy and the like. Information for use by a document reading device for controlling the illumination colour may be provided as metadata in association with document text data, for example annotating the text.

In a related aspect the invention provides an electronic document reading device comprising at least one page attached to a spine, wherein said page has a viewing surface which is curved towards a viewer of the page, and wherein said at least one page is illuminated through the front of said viewing surface from in front of an edge of said curved viewing surface, in particular from said spine.

In some preferred embodiments the electronic document reading device has two pages, one attached to each side of the spine, each being illuminable from the spine. Thus preferably the spine includes an illumination source and a window, in a device with two pages, a window for each page, the window having the form of a stripe along the spine in front of the viewing surface where the page is attached to the spine. In this way illumination from the illumination source may be directed through the window onto the viewing surface of the page or pages.

The device may be configured to selectively illuminate one of the pages currently being read, either manually, for example by means of a user control, or automatically, for example in co-ordination with page turning, say, in response to a page turn event. In embodiments the device may include a manual and/or automatic colour control system to change a colour of the illumination. As mentioned above such a system may be configured automatically to change the illumination colour in accordance with an emotional content of the displayed material.

In a related aspect the invention provides a method of illuminating an electroactive display of an electronic device, the method comprising: configuring the display such that a viewing surface of the display has a concave curvature in one direction, from a viewing side of the display; and illuminating said viewing surface along said direction through a front surface of said display.

In another aspect the invention provides an electronic book having a clamshell configuration, with first and second physical pages hinged at a spine to enable said clamshell to be opened and closed, each said page having a front surface bearing an electronic display which, when said clamshell is closed, is on the inside of said closed clamshell, the rear surfaces of said physical pages providing respective front and rear surfaces of said electronic book when said clamshell is closed, and wherein when said clamshell is closed said front and rear surfaces of said electronic book taper towards an edge of said book opposite said spine.

Preferably a part of said electronic book opposite the spine, when the book is closed, has an overall three-dimensional shape which is generally wedge-shaped.

In embodiments the wedge-shape of the electronic book facilitates insertion of the book into a bookshelf at reduced risk of damage, in particular where the bookshelf is full. In preferred embodiments the clamshell comprises two physical pages hingedly mounted either directly to one another or to an intermediate spine, to allow the pages of the book to be opened and closed. In preferred embodiments a thickness of a physical page tapers away from the hinged mounting, thus contributing to the overall wedge shape when the book is closed. In embodiments each page includes an electronic display with connections along two edges to provide row column drive signals. Preferably neither of these two edges are adjacent the tip of the wedge, again for improved robustness. Optionally one or both corners of a physical page adjacent the tip of the wedge (at the top and the bottom) may be pointed or reinforced.

In a further aspect the invention provides an electronic document reading device having two physical pages each with an electronic page display, said physical pages being hingedly mounted at a spine in a clamshell configuration, said electronic page display being on an inside surface of said reading device when said clamshell is closed, and wherein said reading device includes an external display viewable from the outside of said device when said clamshell is closed.

Preferably the device includes a user control accessible from the outside of the device when the clamshell is closed, and control electronics coupled to the user control and to the external display to enable a user to selectively display information relating to an internal state of the device on the external display when the clamshell is closed. In embodiments the user control comprises a wheel mounted on the spine. The external display may either be horizontal, across the rear of a physical page or vertical, for example along the spine. The displayed information may comprise, for example, one or more items of information from the following: titles of books stored within the device, authors of books stored within the device, books from a selection stored within the device such as a favourites list, top ten list, most recently read list and the like, information on remaining battery life, information identifying how far a user is through a currently read book such as a current page number (bookmark(s)), and the like.

In embodiments the control electronics may be configured to change a function of the user control according to whether the book is open or closed. For example when closed the user control may provide information as described above; when open the user control may provide a page-select or page-turn function, either forwards and/or backwards.

In another aspect the invention provides an electronic document reading device having two physical pages each with an electronic page display, said physical pages being hingedly mounted at a spine in a clamshell configuration, said reading device further comprising control electronics coupled to memory for storing one or more documents to be read, coupled to said electronic page displays for displaying selected pages of a said document to be read, and coupled to a user control for changing said selected displayed pages, and wherein said user control comprises a thumb paddle towards a base of said spine.

In some preferred embodiments the thumb paddle is movable laterally in two orthogonal directions and also incorporates a push-control (vertical movement) to provide a convenient multi-function user interface.

The invention still further provides an electronic document reading device having two physical pages each with an electronic page display, said physical pages being hingedly mounted at a spine in a clamshell configuration, said electronic page displays being on an inside surface of said reading device when said clamshell is closed, wherein each of said electronic page displays has a display surface with a concave curvature in one direction on said display surface, and wherein said clamshell is openable such that a cross-section through said two display surfaces approximates a conic section.

As mentioned above, preferred embodiments incorporate an illumination source to provide substantially uniform illumination of a majority, preferably substantially all, of an electronic page display.

As previously mentioned, for embodiments of a device/book as described above the display preferably comprises a reflective display medium, in particular an electroactive display medium, sometimes referred to as e-ink or e-paper, such as an electrophoretic display. However embodiments of aspects of the invention may alternatively employ other display media, for example an organic LED display medium or a liquid crystal display medium.

As previously mentioned, in preferred embodiments the display is curved; this is facilitated by using a backplane fabricated on a flexible substrate such as PET (polyethylene terephthalate). In preferred embodiments this backplane comprises an active matrix backplane including a plurality of thin film transistors (TFTs) configured to implement pixel drive circuitry for the electroactive display. The active matrix backplane is preferably fabricated using a solution deposition technique, preferably employing organic semiconducting material, although alternatively solution-deposited inorganic semiconductor materials such as CdSe nanoparticle material may be employed.

According to a still further aspect of the invention there is provided an electronic reader having two pages attached to a central spinal region, each of said pages incorporating a display, said spinal region incorporating a light source to illuminate said displays from the side of each page such that a substantially uniform distribution of light is provided across each said display.

Preferably the two pages form front and back covers of the electronic reader. In embodiments, the electroactive display comprises a reflective bistable display, such as an electrophoretic display.

BRIEF DESCRIPTION OF THE DRAWINGS

These and other aspects of the invention will now be further described, by way of example only, with reference to the accompanying figures in which:

FIG. 4 shows an example configuration of connectors to an electrophoretic display of the device of FIG. 1a;

FIG. 5 shows a rear, perspective view of the device of FIG. 1a; and

FIG. 6 shows a block diagram of a control system for the device of FIG. 1a.

DETAILED DESCRIPTION OF THE PREFERRED EMBODIMENT

We will describe an electronic document reading device ("electronic reader") comprising pages incorporating electronic displays, with an integrated light source to produce a uniform distribution of illumination across each page.

Figure 1A:
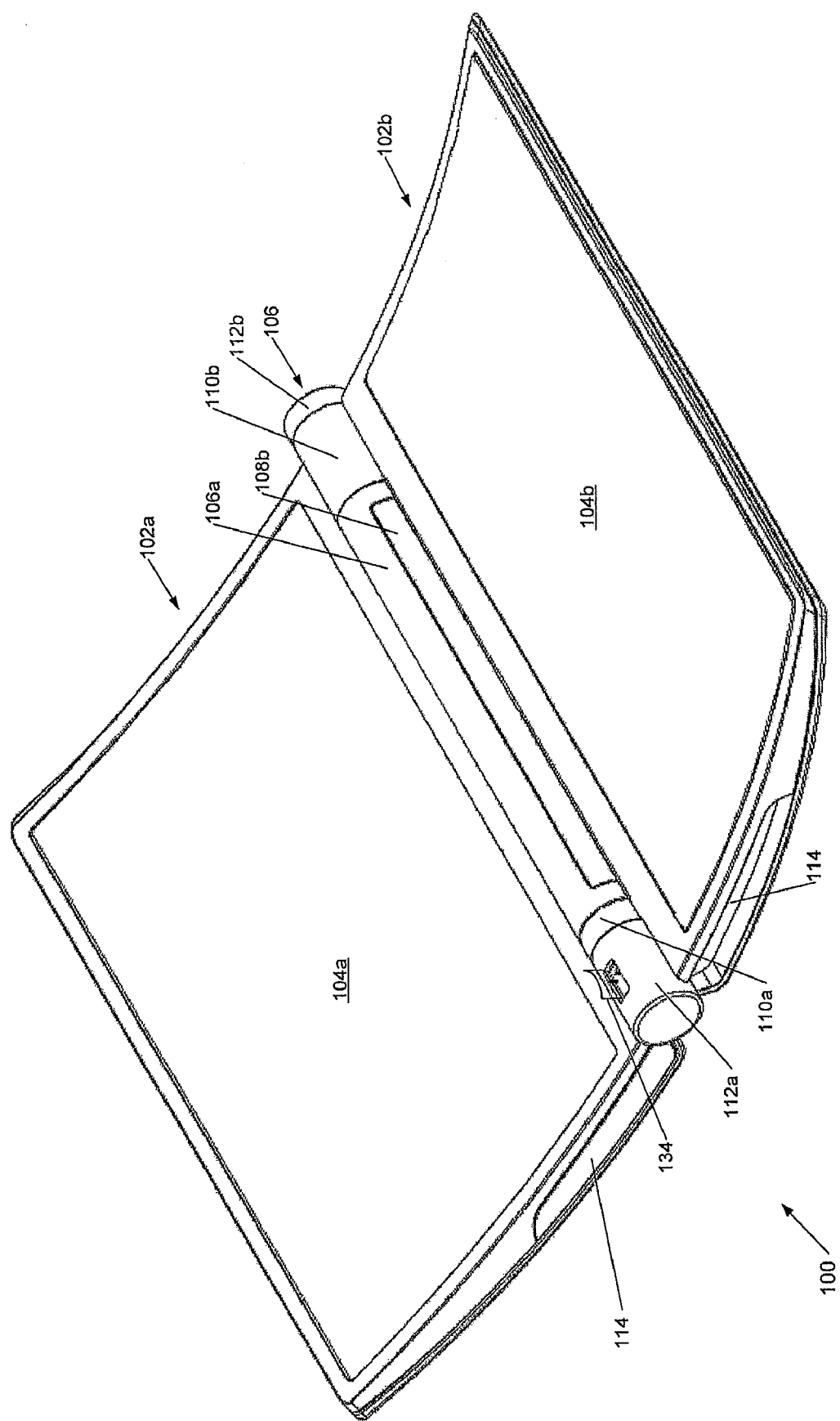
FIGS. 1a to 1d show, respectively, a perspective view of a first embodiment of an electronic document reading device according to the invention, in an open configuration, an end view of the device of FIG. 1a showing curvature of the display surfaces of the device in said open configuration, a vertical cross-section through a curved electrophoretic display for the device of FIG. 1a, and a perspective view of a second embodiment of an electronic device according to the invention.

Referring to FIG. 1a, this shows an embodiment of an electronic document reading device 100 having a pair of pages 102a, b each with an electronic display region 104a, b, in preferred embodiments provided by an electroactive display such as a reflective bistable display, here an electrophoretic display. The pages 102 are each attached to a central spine 106, for example in the form of a column. In some preferred embodiments each page can be rotated individually about the central spine; optionally a stop may be provided to limit the opening angle of the two pages. An end view of the open device is shown in FIG. 1b; preferably the electronic displays form a smooth curve when the device is open.

In embodiments the spine 106 is provided with a pair of windows 108, one of which 108b is shown in the perspective view of FIG. 1a. Each of these windows provides illumination for the corresponding electronic display, for example window 108b for display 104b (the device of FIG. 1a is symmetrical in this respect). The spine 106 includes a light source which emits a stripe of light through a window 108 such that the electronic display area 104 is substantially uniformly illuminated, in particular because the electronic display surface is curved, as shown more clearly in FIG. 1b.

As shown in FIG. 1a, preferably the window providing illumination is just in front of an edge of the display 104. In this way the illumination passes through a front-most surface of the electrophoretic display 104. To position the windows just in front of the edges of the displays 104 a region 106a of the spine 106 comprising the windows 108 may be provided with a stop so that when the pages 104 are open the windows are correctly positioned. Additionally or alternatively region 106a of the spine 106 may be arranged so that the windows 108 are symmetrically positioned with respect to the pages 104 for a range of angular openings of pages 104, for example by a spring attached to each hinge of the pages 104a, b (in FIG. 1a hinges 110a, b of page 104b and hinges 112a, b of page 104a).

Figures 1B, 1C:
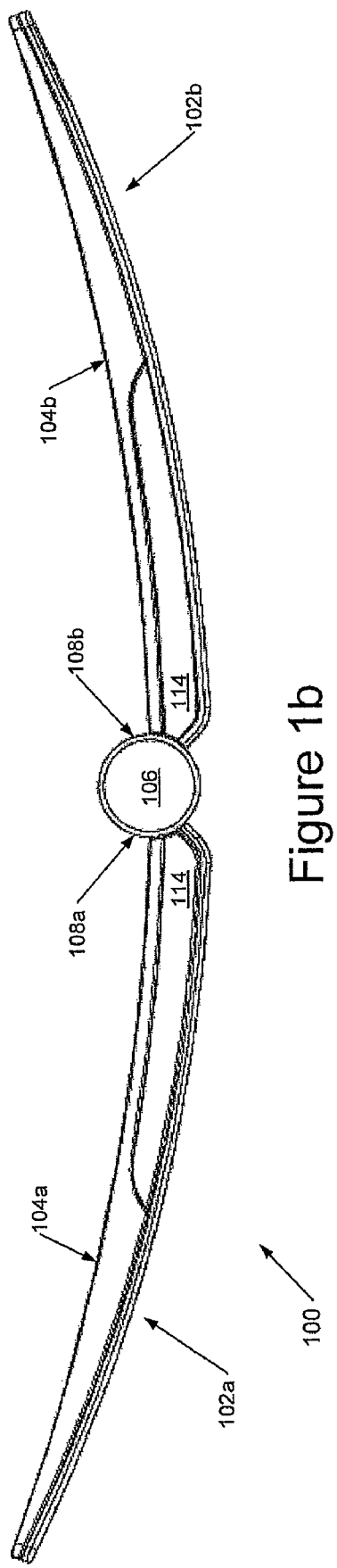

FIG. 1c shows a vertical cross section through a part of an electronic display 104 according to a preferred embodiment of the invention As mentioned above, in preferred embodiments the display medium is a reflective display medium, in particular an electrophoretic display medium 120. This is laminated to an active matrix backplane comprising a flexible substrate 122 such as PET (polyethylene terephthalate) or PEN (polyethylene naphthalene) on which is fabricated a thin layer of organic active matrix pixel driver circuitry 124 for electrophoretic display 120.

Preferred electrophoretic displays are used. Preferably the display and substrate are sandwiched between a pair of moisture barriers 126a, b, for example of polyethylene and or Aklar™, a fluoropolymer (polyfluorotrifluoroethylene-PCTFE).

Typical approximate thicknesses for each layer of the display 104 are in the region of 200 μm, although the active matrix circuitry is thinner, for example around 5 μm and moisture barrier 126b can be thinner than barrier 126a if it incorporates a metallic moisture barrier such as a layer of aluminium foil (since barrier 126b does not need to be transparent). Optionally a front panel, for example of perspex, may be provided over (in front of) moisture barrier 126a, although in embodiments this is not necessary and, generally speaking, it is desirable to keep the overall thickness of the display low.

In preferred embodiments the active matrix pixel driver circuitry 124 comprises transistors fabricated using solution-deposition based processes, preferably patterned by techniques such as direct-write printing, laser ablation or photolithography. We have previously described full details of such processes in the applicant's earlier patent applications including, in particular, WO 01/47045, WO 2004/070466, WO 01/47043, WO 2006/059162, WO 2006/056808, WO 2006/061658, WO 2006/106365 and PCT/GB2006/050265 all hereby incorporated by reference in their entirety.

Referring again to FIGS. 1a and 1b, the structure of the display illustrated in FIG. 1c, in particular the use of a flexible substrate and solution-deposition based, preferably organic electrophoretic display driver circuitry facilitates imparting a curve to the electronic display area, as illustrated, which in turn facilitates the above-described method of illumination.

Figure 1D:
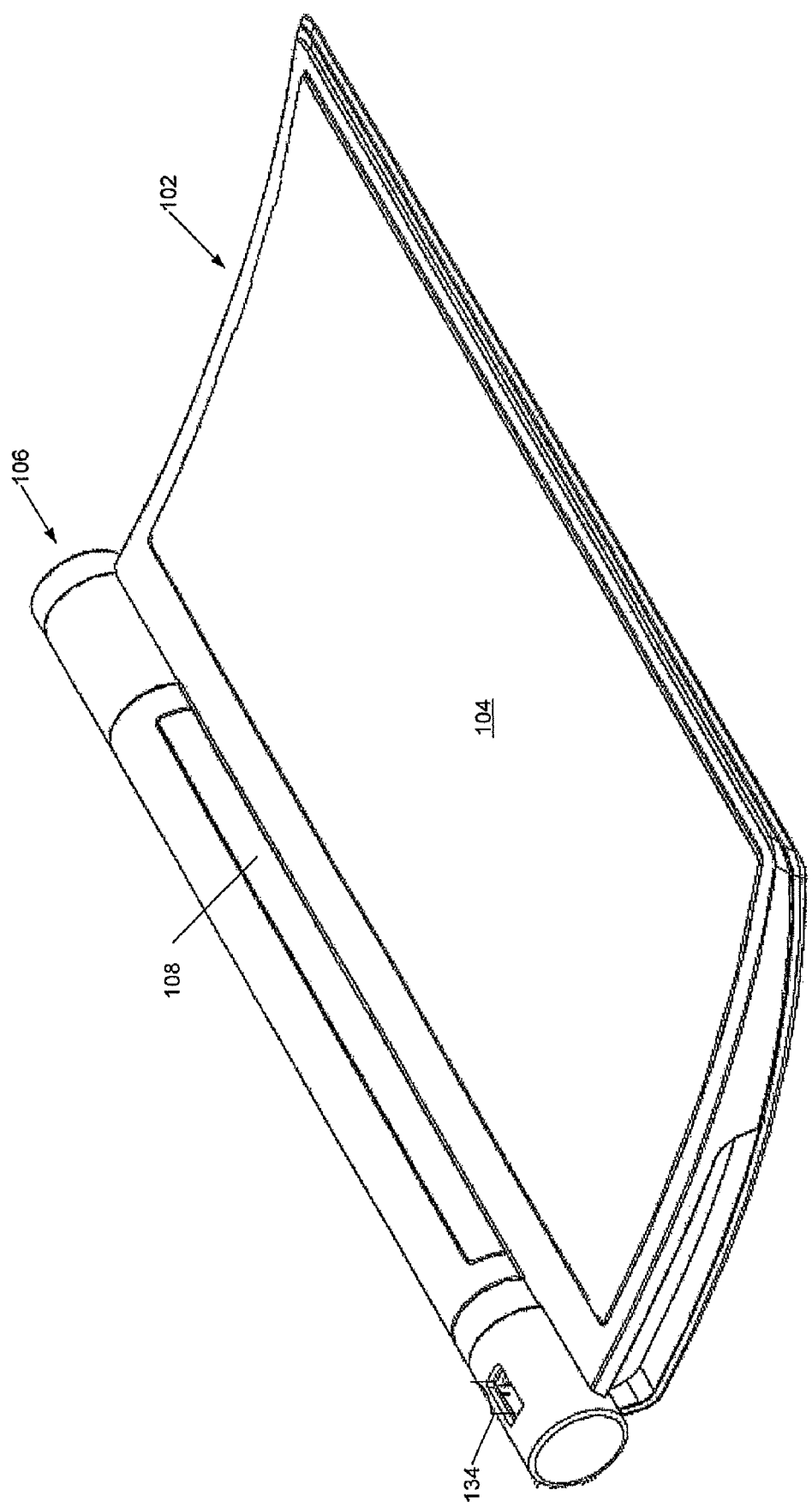

FIG. 1d, in which like elements to those of FIG. 1 are indicated by like reference numerals, illustrates that a similar illumination technique can be employed with an electrophoretic display with concave curvature in an electronic device with, in embodiments, only a single illuminated electrophoretic display. Such a device may comprise, for example, an electronic organiser (PDA), mobile phone or some other consumer electronic device, typically of the small, hand-held type.

Figures 2A, 2B:
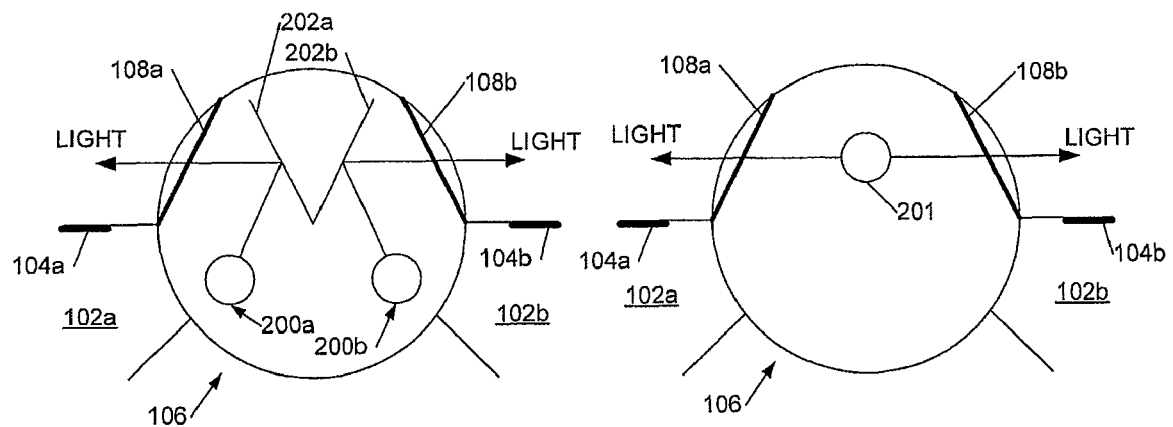
FIGS. 2a to 2d show, respectively, first and second example optical arrangements for illuminating the electronic pages of the device of FIG. 1a, a schematic ray diagram for illumination of open pages of an electronic book, and a similar diagram illustrating partially closed pages.

Referring now to FIGS. 2a and 2b, these illustrate example optical arrangements for the spine 106 of the electronic document reading device 100 of FIG. 1a showing, in particular, vertical cross-sections through spine 106.

In the example of FIG. 2a two sets of LEDs 200a, b each extending in a longitudinal direction along the spine 106 provide light to illuminate respective electronic displays 104a, b via reflectors 202a, b and diffusing windows, 108a, b. Optionally the optical system may also include one or more lenses. In FIG. 2b a single row of LEDs 201 provides light for both electronic display 104a, b and, in this example, the LEDs are positioned higher so that no reflectors are needed. As described above, in both cases the light through windows 108a, b preferably provides substantially uniform illumination over the majority, preferably all of a display area of an electronic display 104. The angle at which the pages are open may be adjusted by a user to achieve a substantially uniform illumination and/or a stop may be positioned so that the pages, when fully open, are substantially uniformly illuminated. (Here references to substantially uniform illumination refer to illumination, which to a user, appears approximately even over more than 70%, 80% or 90% of the display area in the absence of other illumination).

Figure 2C:
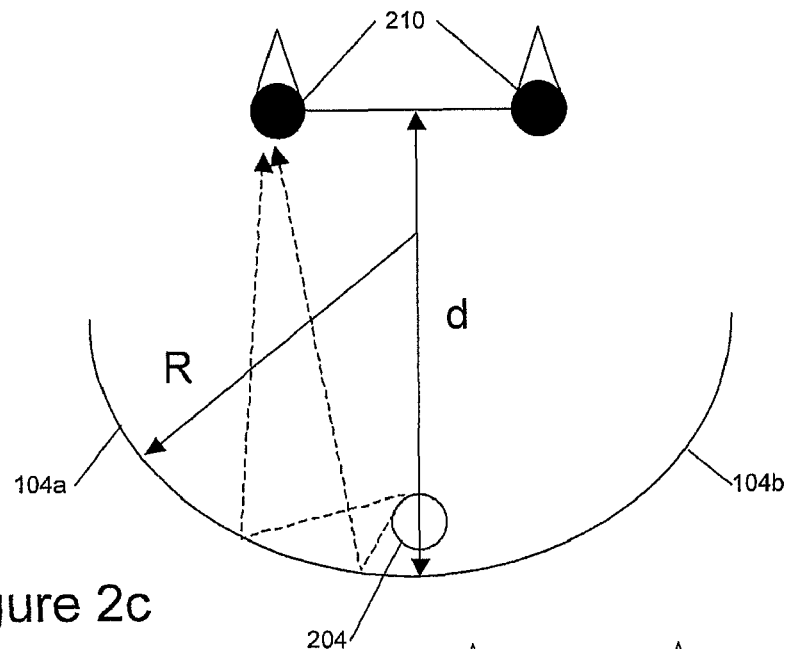
Figure 2D:
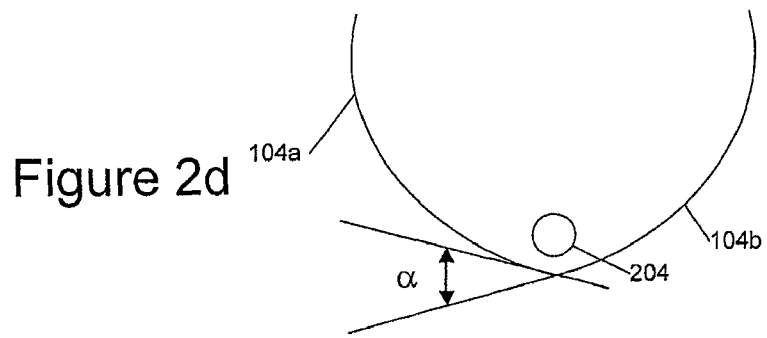

Referring now to FIG. 2c, this shows a schematic ray diagram illustrating illumination of curved display surfaces 104a, b. In the illustrated example the electronic displays approximate a surface with a defined radius of curvature R and the eyes 210 of the user are at a distance d, typically around 30 cm although potentially in a range of, for example, 10-50 cm. (An example monochrome display may have a resolution of, say, 100-250 pixels per inch, for example 150-170 pixels per inch). Light source 204 is preferably a diffuse light source (for example a light source employing a diffusing window) such that for any point on the display surface some light rays emitted from the light source (dashed lines) hit the eyes 210 of the user. The radius of curvature R is selected such that for a specific reading distance d the display appears most uniform. The optimum radius of curvature for a given reading distance and light source may be determined by straightforward optical engineering, in a manner well known to those skilled in the art. If the user decides to vary the reading distance he or she may adjust the opening angle α between the two display surfaces to achieve optimum illumination conditions, as shown in FIG. 2d.

Generally the radius of curvature of the display is chosen to be similar to the reading distance. This helps to give the reader the feeling of being immersed in the reading experience, and to create a comfort zone between him/her and the electronic book. The skilled person will appreciate that more complex curvatures, for example not involving a single radius of curvature, may also be employed. For example optical engineering software may be employed to optimise brightness and/or uniformity of the illumination, allowing the curvature or more generally the shape of the surface to vary to achieve this. Optionally additional lighting may be employed to further improve brightness and/or uniformity of the illumination. Example side lighting techniques used in the LCD industry are described in the background prior art acknowledged in the introduction to the application, in particular U.S. Pat. No. 5,739,887, U.S. Pat. No. 6,791,635 and U.S. Pat. No. 6,343,868. These describe transmissive LCD panels and flat, rigid glass displays but the inventor has recognised that the techniques described therein may be adapted to a reflective, curved display, in particular by mounting a light-guiding film on the surface of the display.

As previously mentioned, preferably the light source, more particularly a window, is positioned at the edge of each side of the spine 106, where the spine meets the display, in a strip down each side of the spine. Alternatively a light source may be mounted on a page 102, more particularly on a strip of surround of the electronic display 104 between the electronic display and the spine. Depending upon the curvature of the pages, provided the illumination is relatively low profile the pages 102 may still be closed. Less preferably a light source for illuminating the curved surface of the display may be provided along an outer edge of a page 102, again preferably in the strip between the electronic display area and the edge of the page. In such embodiments the pages may be inhibited from closely closing although in embodiments this may be tolerable.

In embodiments of the device the sets of LEDs 200, 201 may be configured to provide illumination of more than one colour (here a colour including white), for example by using bi- or multi-colour LEDs and/or by alternating LEDs of different colours longitudinally along the spine 106. Mood lighting may then be provided, for example allowing a user to select a preferred colour for illuminating the display. For example green light is thought to improve concentration whilst red light is generally considered preferable for use in dim/night lighting conditions. In embodiments such a mood lighting feature may be turned on or off according to the desire of the user.

Additionally or alternatively the device may be configured to provide intelligent lighting, more particularly lighting that it is able to change light colour and/or intensity according to the "mood" of the displayed material. In a simple implementation the light colour and/or intensity may be determined based upon a page number of the displayed document, changing as the user scrolls through the pages. For example an orange glow across a display may be employed to represent a morning scene and dark blue lighting may be used, for example, to represent an evening or twilight scene. In a similar way, red light, say, may be used for a happy scene and blue light for a sad scene, and so forth.

Figures 3A, 3B:
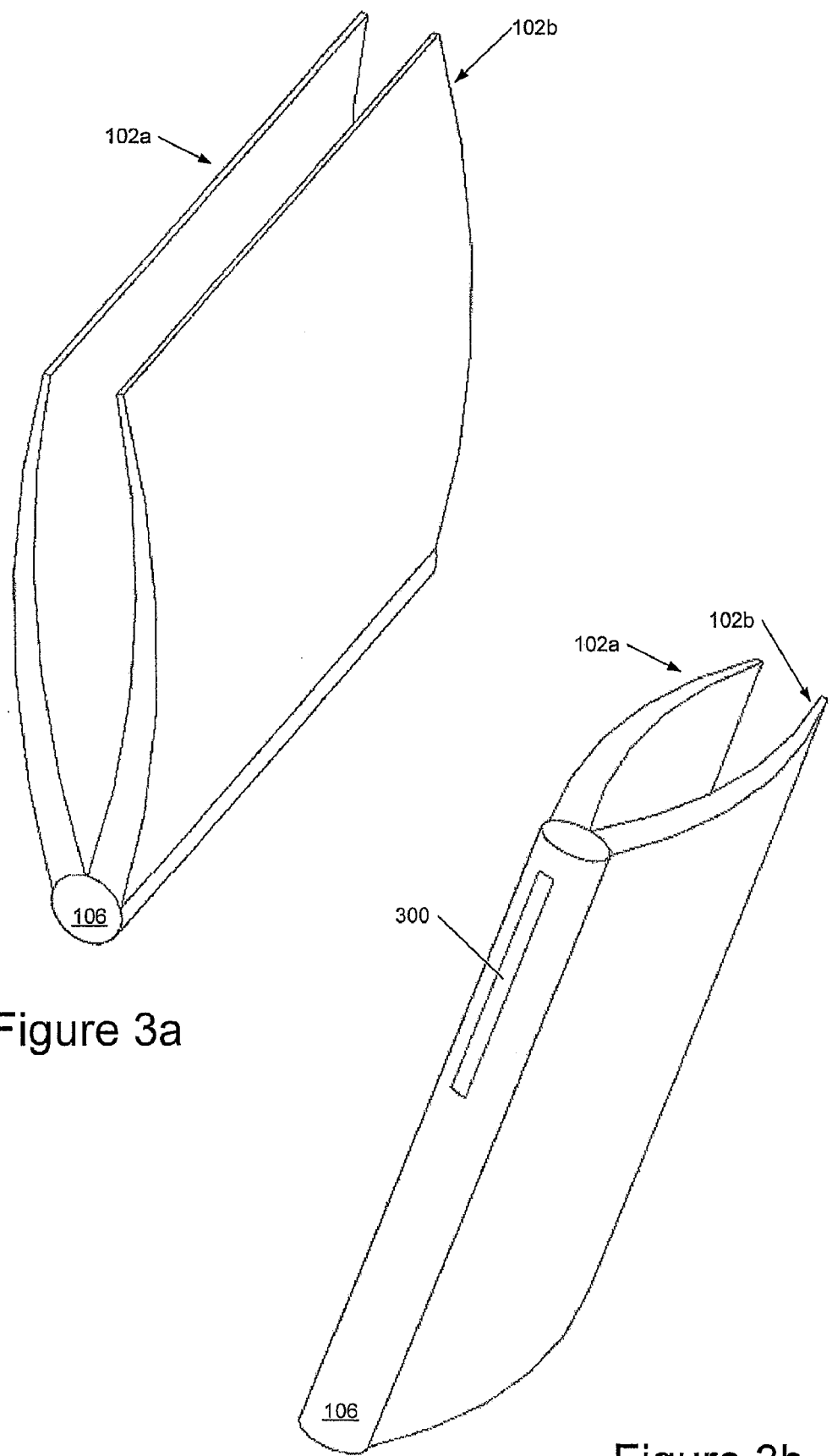
FIGS. 3a and 3b show first and second views of a device similar to that shown in FIG. 1a in a closed configuration.

Referring now to FIG. 3, this shows the device with the pages in a closed position. The back surfaces of the pages 102 effectively provide front and rear covers for the electronic book. In a fully closed position the pages 102a, b touch along their respective peripheral edges parallel to the spine, in embodiments leaving a gap between the pages when the device is closed. The curve of the outer surfaces of the pages (front and rear covers) between the spine and the closed edges facilitates easing the electronic reader into position between other items such as conventional books on a shelf. Optionally one peripheral corner of the device may be reinforced, pointed or curved to aid insertion between such other items; this corner may then lead the placement of the electronic book onto a shelf. In embodiments the device includes an external electronic display, preferably a further electrophoretic display. FIG. 3b illustrates an example of an electrophoretic display 300 running down the spine of the electronic book; more details of such an external electrophoretic display are given below.

Continuing to refer to FIG. 3, and also referring again to FIG. 1b, when open the two pages (attached to the spine) have an overall generally crescent shaped cross-section. Thus, as can be seen, preferably the thickness of each page tapers away from the spine towards the edge of the page opposite the spine. For example in embodiments the thickness of a page decreases from around 10 mm near the spinal region to approximately 4 mm at the edge furthest from the spinal region. This change in width provides the user with the impression that the electronic document reading device is thinner than it actually is. This taper, together with the curvature of a page, results in the outer surface of a page having a slightly greater curvature than the inner, display surface of a page. In embodiments the inner, display surface of a page has a curvature such that tangents to the surface at opposite edges of the display surface include an angle of approximately 150°, which may be referred to as a "curvature" of approximately 30°. Generally, however, the curvature may vary substantially from 5° 10°, 15° or 20° to 40°, 50° or more; in still other embodiments the display surface may be substantially flat. The curvature may be selected for example by routine experiment to obtain a perceived illumination which is sufficiently uniform.

The differing curvatures of the front and back surfaces of a page creates a region 114 between these front and back surfaces in the vicinity of the spine 106. This region may be used, for example, for the control electronics and/or a rechargeable power supply such as a rechargeable battery and/or for one or more user controls. It is particularly convenient, however, to use one or both of regions 104 to house one or more external connectors for the device, such as a USB port connector and/or an edge connector or similar for the control electronics/power supply.

Figure 4:
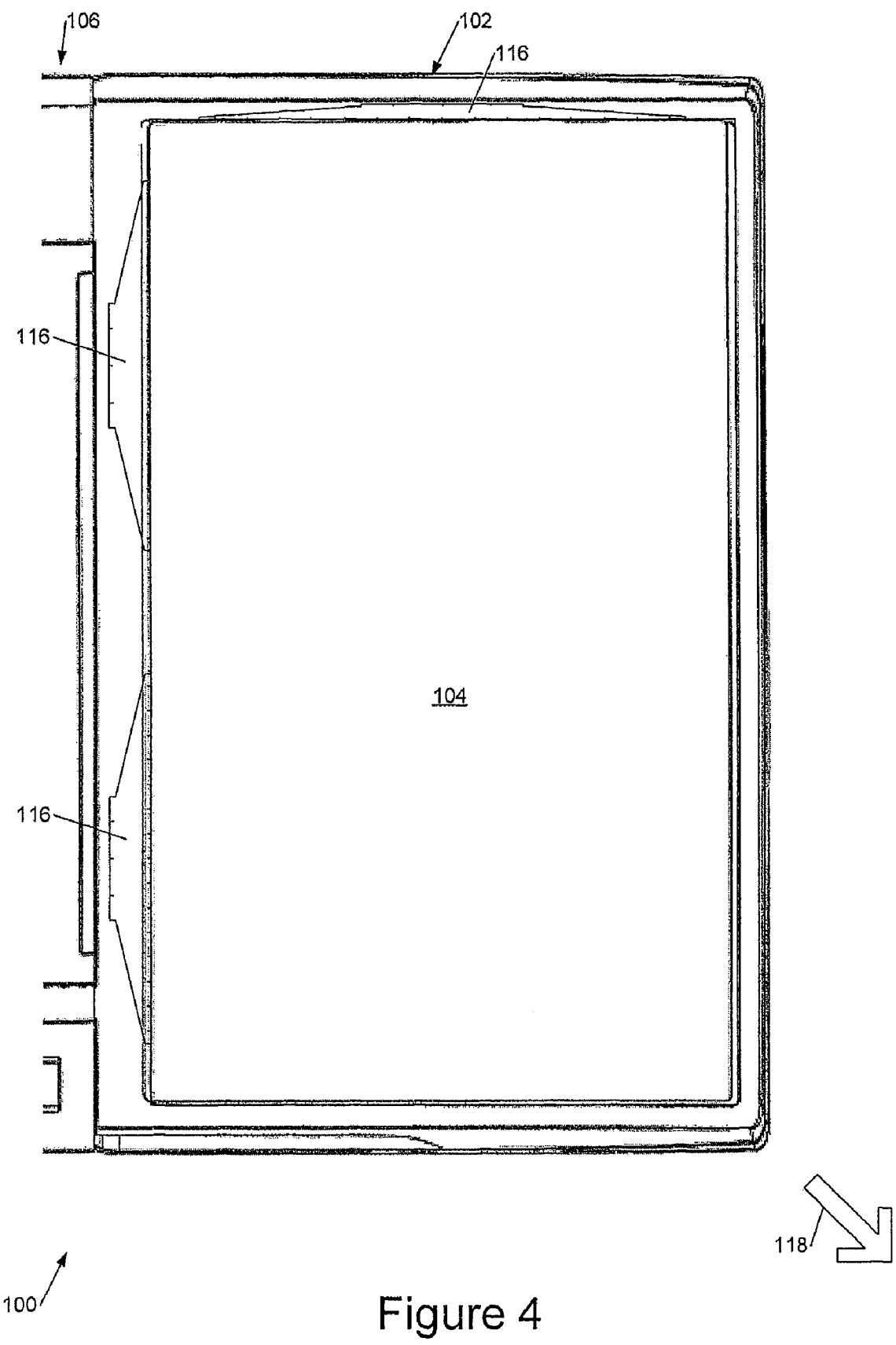

Referring now to FIG. 4, this shows a view from above of a portion of an electronic document reading device 100 of the type shown in FIG. 1a, illustrating a preferred configuration of flexible connectors 116, such as TCPs (tape carrier packages) between the organic active matrix backplane (as shown in FIG. 1c) and associated control electronics for the device, described below. As shown the connectors 116 are preferably positioned along an upper and inner edge of the electronic display 104, providing additional protection when the device, in the form of an electronic book, is inserted into a bookshelf in a direction shown by arrow 118. Thus, as illustrated, row connectors for the display are positioned adjacent the spine 106 and column connectors at the top edge of display 104, although in other embodiments the column connectors may be positioned along the bottom edge of display 104. Such configurations help to increase the overall robustness of the device.

Figure 5:
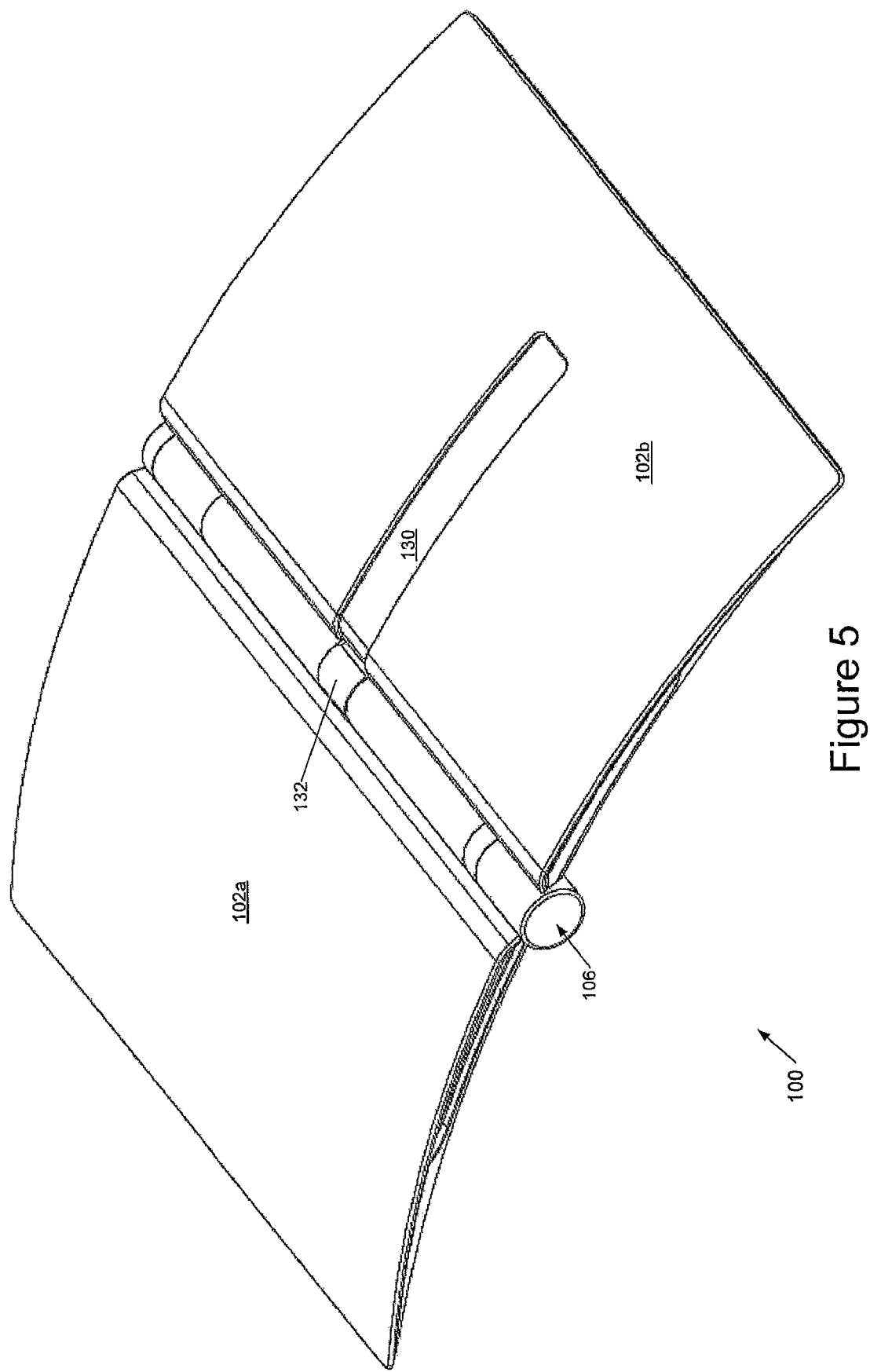

Referring now to FIG. 5, this shows a view of a rear of the device 100, illustrating an additional "external" electrophoretic display 130 which is preferably provided on an external surface of the device so that the display is visible when the device is closed, for example along the spine (as shown in FIG. 3b) or as shown in FIG. 5 on a rear surface of one of the pages 102. Display 130 may indicate a variety of information, for example a selected document/publication currently being read, a remaining amount of battery life, a page or bookmark position, and the like. Preferably an additional user control is provided on the exterior of the device. Ergonomically a scroll wheel 132 on the spine has been found to be particularly advantageous. This may be used to scroll through items on display 130 and/or a menu of publications stored within the device and the like.

In some embodiments the electronic book 100 incorporates a sensor to determine whether the book is open or closed and in response to this, changes one or more functions of spine wheel 132. Thus, for example, when the book is open wheel 132 may be employed to turn pages forwards and/or backwards through the publication currently being read.

Referring again to FIG. 1a, preferred embodiments of the electronic book 100 also incorporate a thumb paddle 134. The location of paddle 134 at the base of the spine 106 facilitates one-handed operation of the device while holding the device in the same hand or reading. In embodiments thumb paddle 134 provides a joystick-type function with lateral movement in two orthogonal directions; preferably it also provides a push-button function. In embodiments paddle 134 combines a plurality of push-button functions selectable by selecting a degree of inward pressure on the control 134; such a function may be provided whether or not any additional joystick-type function is implemented (and if a joystick-type function is not implemented the control need not have a "paddle" shape).

Figure 6:
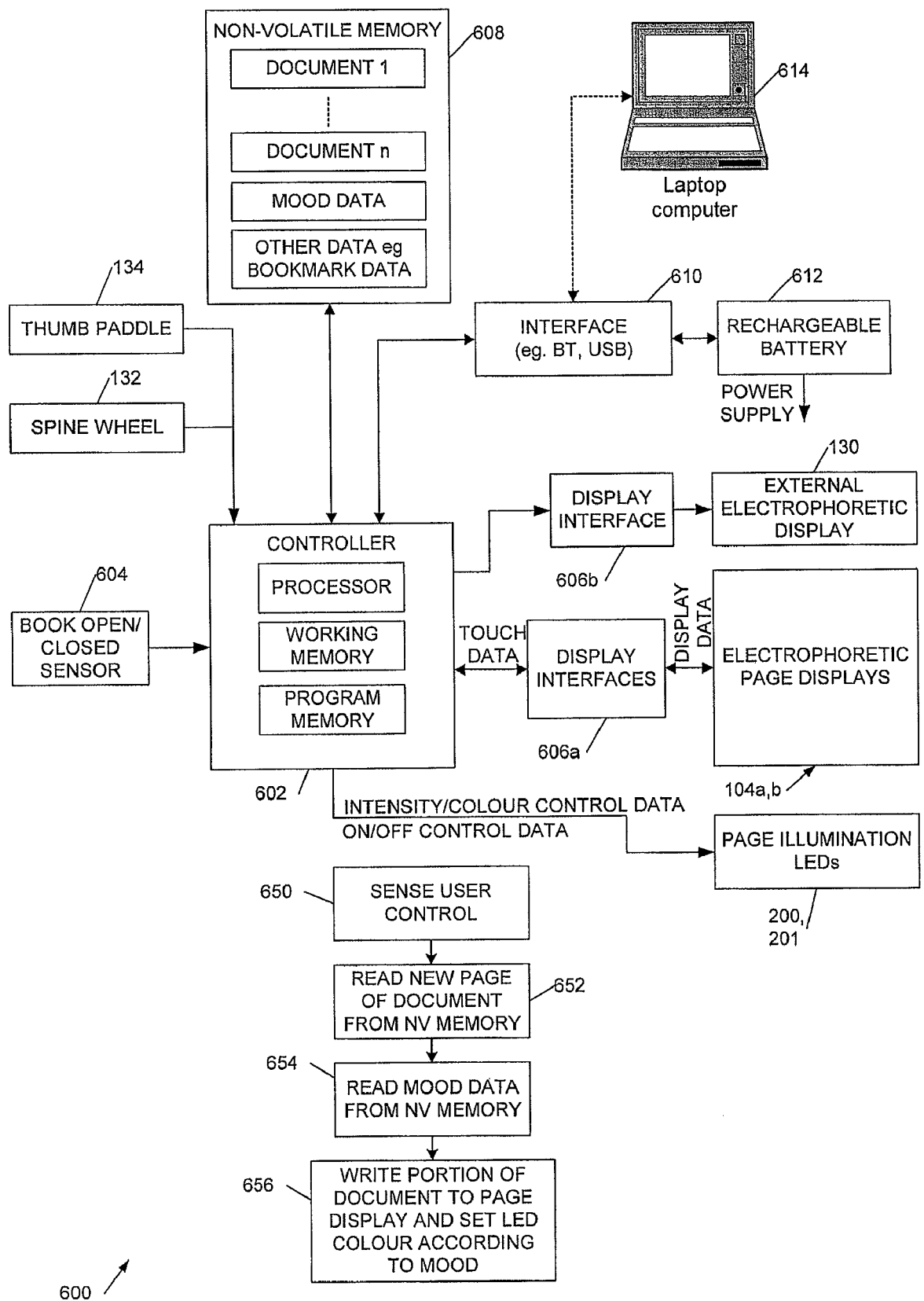

Referring now to FIG. 6, this shows example electronic control circuitry 600 suitable for an electronic document reading device of the type shown in FIG. 1a. The control circuitry 600 comprises a controller 602 including a processor, working memory, and non-volatile programme memory. The controller 602 is also coupled to non-volatile data memory 608, such as Flash memory, for storing data for a plurality of electronic documents for display, and other data such as mood data, bookmark data (for example identifying a current page) and the like. The controller 602 receives user input from the thumb paddle 134 and the spine wheel 132 as well as, in embodiments, from a book open/closed sensor 604. The controller 602 is also coupled to display interfaces 606a for the respective electrophoretic displays 104a, b; optionally these may be touch-sensitive as described in our co-pending international patent application PCT/GB2006/050220, hereby incorporated by reference in its entirety. Preferably the controller 602 is also coupled to an external electrophoretic display 130 via a further display interface 606b. An external interface 610 is provided for interfacing with a computer such as laptop 614 to receive document data and, optionally, to provide data such as user bookmark data, user read list/book preference data and the like. The interface 610 may comprise a wired, for example USB, and/or wireless, for example Bluetooth™ interface and, optionally, an inductive connection to receive power. The latter feature enables embodiments of the device to entirely dispense with physical electrical connections. A rechargeable power source 612 such as a rechargeable battery is preferably used to provide an internal power supply; this may be recharged via interface 610.

The controller 602 is also coupled to page illumination LEDs 200, 201 or a similar illumination source. Preferably the controller is able to control the page illumination on and off, for example in response to the book being opened and shut. In embodiments user and/or automatic control of page illumination intensity and/or colour may also be provided to control the page illumination, for example as previously described.

The programme memory of controller 602 stores processor control code for implementing electronic book functions. In particular to implement mood page illumination control an example procedure may sense operation of a user control such as thumb paddle 134 (step 6050) and in response read a new page of the currently read document from non-volatile memory 608 (step 6052). The procedure may then read mood data associated with the currently read document page from the non-volatile memory 608 (step 6054) and then write the updated page information to the page display and control the page illumination LEDs in accordance with the mood data for the current page (step 6056). Some particularly advantageous techniques for updating pages of an electronic document reading device are described in our co-pending international patent application number PCT/GB2006/050235, hereby incorporated by reference in its entirety.

No doubt many other effective alternatives will occur to the skilled person. For example although some preferred embodiments of the device employ LED illumination many other types of illumination may be employed including, but not limited to one or more incandescent bulbs, an electroluminescent panel (ELP), one or more cold cathode fluorescent lamps (CCFL) or (less preferably) hot cathode fluorescent lamps. In general, however, semiconductor-based light emitters are preferable because of their low power consumption.

The skilled person will understand that references to a document are to be interpreted broadly and include (but are not limited to): newspapers, books, emails, attachments, web pages, mark up language documents, written music, written computer programs, images, and other graphical representations, for examples comics. An electronic book as described above may also incorporate other functions, for example a calculator, an organiser, a game such as chess and the like.

The skilled person will understand that a document reading device of the type described above is not restricted to documents in any particular language such as English and may, for example, be used with languages with different script reading and/or page turning directions, such as Arabic, Chinese and (sometimes) Japanese.

The skilled person will also understand that a document reading device of the type described above is not restricted to electrophoretic displays. Other like electroactive or reflective bistable displays may be used instead.

It will be understood that the invention is not limited to the described embodiments and encompasses modifications apparent to those skilled in the art lying within the spirit and scope of the claims appended hereto.

What is claimed is:

1. An electronic device including an electroactive, reflective display and a light to illuminate said display, wherein said display has a viewing surface, and wherein said light is configured to provide a stripe of illumination along an edge of said viewing surface and directed across the viewing surface and through the viewing surface, wherein said viewing surface is an outer-most surface of said display and is configured to reflect light from said stripe directly to a user to allow the user to view an image displayed on said display, and wherein said viewing surface has a concave curvature towards said stripe such that said illumination from said stripe provides uniform illumination over a majority of said viewing surface.

2. An electronic device as claimed in claim 1 wherein said light is configured to provide said a stripe of illumination along substantially a complete edge of said viewing surface and directed across said viewing surface.

3. An electronic device as claimed in claim 2 wherein said light comprises a plurality of LEDs.

4. An electronic device as claimed in claim 1 wherein said light comprises a light source at least partially behind said edge of said viewing surface of said display and an optical system to direct illumination from said light source onto said viewing surface from the front of said edge of said viewing surface.

5. An electronic device as claimed in claim 1 including two said electroactive displays mounted on a central support, and wherein said light is mounted within said central support.

6. An electronic device as claimed in claim 1 wherein said light is configured to change colour, and wherein said device includes a system to control a colour of said light in coordination with information displayed on said device.

7. An electronic device as claimed in claim 1 wherein said device is an electronic book.

8. An electronic device as claimed claim 1 wherein said electroactive display has an active matrix organic electronic backplane.

9. An electronic device as claimed in claim 1, wherein said electroactive display comprises an electrophoretic display.

10. An electronic document reading device comprising an electronic device according to claim 1 and at least one page attached to a spine, wherein said page has said display having said viewing surface.

11. An electronic document reading device as claimed in claim 10 wherein said spine includes an illumination source and a window having the form of a stripe along said spine in front of an edge of said viewing surface where said page is attached to said spine, and wherein illumination from said illumination source is directed through said window onto said viewing surface.

12. An electronic document reading device as claimed in claim 11 configured to selectively illuminate one of said pages currently being read.

13. An electronic document reading device as claimed in claim 10 having two said pages, one attached to each side of said spine, and wherein each of said pages is illuminable from said spine.

14. An electronic document reading device as claimed in claim 10 further comprising a colour control system to change a colour of said illumination.

15. An electronic document reading device as claimed in claim 14 wherein said colour control system is configured to automatically change said colour of said illumination in accordance with an emotional content of material displayed by said reading device on said viewing surface.

16. An electronic document reading device as claimed in claim 10 wherein said page comprises an electroactive display with a solution-deposited electronic backplane.

17. An electronic document reading device as claimed in claim 16, wherein said electroactive display comprises an electrophoretic display.

18. An electronic document reading device as claimed in claim 10 having a clamshell configuration, with a first physical page and a second physical page hinged at said spine to enable said clamshell to be opened and closed, each said page having a front surface bearing an electronic display which, when said clamshell is closed, is on the inside of said closed clamshell, the rear surfaces of said physical pages providing respective front and rear surfaces of an electronic book when said clamshell is closed, and wherein when said clamshell is closed said front and rear surfaces of said electronic book taper towards an edge of said book opposite said spine.

19. An electronic document reading device as claimed in claim 18 wherein when said clamshell is closed a part of said electronic book adjacent said edge opposite said spine has an overall three-dimensional shape which is generally wedge-shaped.

20. An electronic document reading device as claimed in claim 19 wherein a thickness of a said physical page tapers towards an edge of a said physical page opposite said spine.

21. An electronic document reading device as claimed in claim 19 including display drive and control circuitry, wherein a said electronic display has a set of connections to said display drive and control circuitry along two edges, and wherein said edges do not include an edge of a said physical page opposite said spine.

22. An electronic document reading device as claimed in claim 10 having two physical pages each with an electronic page display, said physical pages being hingedly mounted at said spine in a clamshell configuration, said electronic page display being on an inside surface of said reading device when said clamshell is closed, and wherein said reading device includes an external display viewable from the outside of said device when said clamshell is closed.

23. An electronic document reading device as claimed in claim 22 including a user control accessible from the outside of said device when said clamshell is closed, and control electronics coupled to said user control and to said external display to enable a user to selectively display information relating to an internal state of said device on said external display when said clamshell is closed.

24. An electronic document reading device as claimed in claim 23 wherein said user control comprises a wheel mounted on said spine.

25. An electronic document reading device as claimed in claims 23 wherein said control electronics is configured to change at least one function of said user control between open and closed configurations of said clamshell.

26. An electronic document reading device as claimed in claim 10 having two physical pages each with an electronic page display, said physical pages being hingedly mounted at said spine in a clamshell configuration, said reading device further comprising control electronics coupled to memory for storing one or more documents to be read, coupled to said electronic page displays for displaying selected pages of a said document to be read, and coupled to a user control for changing said selected displayed pages, and wherein said user control comprises a thumb paddle towards a base of said spine.

27. An electronic document reading device as claimed in claim 26 wherein said thumb paddle is moveable laterally in two orthogonal directions, and vertically into said spine, to control said reading device.

28. A method of illuminating an electroactive, reflective display of an electronic device, the method comprising:
  configuring the display such that a viewing surface of the display has a concave curvature in one direction, from a viewing side of the display; and
  using a light to provide a stripe of illumination along an edge of said viewing surface and directed across said viewing surface, wherein said viewing surface is an outer-most surface of said display and is configured to reflect light from said stripe directly to a user to allow a said user on said viewing side to view an image displayed on said display,
  wherein said concave curvature is towards said stripe and such that said illumination from said stripe provides uniform illumination over a majority of said viewing surface.

29. A method as claimed in claim 28 wherein said electroactive display comprises an electrophoretic display.

* * * * *